United States Patent
Roh

(10) Patent No.: US 10,354,499 B2
(45) Date of Patent: Jul. 16, 2019

(54) VIBRATOR CONTROLLING METHOD AND APPARATUS

(71) Applicant: Samsung Electronics Co., Ltd., Suwon-si, Gyeonggi-do (KR)

(72) Inventor: ChangHyun Roh, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/894,320

(22) Filed: Feb. 12, 2018

(65) Prior Publication Data
US 2019/0122507 A1    Apr. 25, 2019

(30) Foreign Application Priority Data
Oct. 23, 2017    (KR) .......................... 10-2017-0137294

(51) Int. Cl.
*B41J 2/015*      (2006.01)
*G08B 6/00*      (2006.01)
*H04W 4/80*      (2018.01)

(52) U.S. Cl.
CPC .................. *G08B 6/00* (2013.01); *H04W 4/80* (2018.02)

(58) Field of Classification Search
None
See application file for complete search history.

(56) References Cited

U.S. PATENT DOCUMENTS

| 8,308,665 | B2 |  | 11/2012 | Harry et al. |  |
|---|---|---|---|---|---|
| 8,350,671 | B2 | * | 1/2013 | Kim | H04L 51/24 340/7.51 |
| 9,135,792 | B2 | * | 9/2015 | Han | G08B 6/00 |
| 2007/0159507 | A1 | * | 7/2007 | Urano | G04C 3/12 347/20 |
| 2014/0316309 | A1 |  | 10/2014 | Seo et al. |  |
| 2016/0012687 | A1 | * | 1/2016 | Obana | A63F 13/54 340/407.1 |
| 2016/0324487 | A1 |  | 11/2016 | Guo et al. |  |
| 2017/0156662 | A1 |  | 6/2017 | Goodall et al. |  |
| 2018/0085281 | A1 |  | 3/2018 | Roh |  |

FOREIGN PATENT DOCUMENTS

| JP | 2006204520 A | 8/2006 |
|---|---|---|
| KR | 20120057626 A | 6/2012 |
| KR | 101248190 B1 | 3/2013 |
| KR | 101492862 B1 | 2/2015 |

OTHER PUBLICATIONS

Slavko Rogan et al., "Stochastic resonance whole-body vibration training for chair rising performance on untrained elderly—A pilot study", Archives of Gerontology and Geriatrics 55 Mar. 2012, pp. 468-473.

Attila A. Priplata et al., "Vibrating insoles and balance control in elderly people", The Lancet, vol. 362, Oct. 4, 2003, pp. 1123-1124, www.thelancet.com.

* cited by examiner

*Primary Examiner* — K. Wong
(74) *Attorney, Agent, or Firm* — Harness, Dickey & Pierce, P.L.C.

(57) ABSTRACT

Provided is a vibrator controlling method and apparatus. The vibrator controlling apparatus may control a vibrator to generate a vibration of a magnitude not to be sensed by a user. A stimulus of at least a threshold of nerves may be generated when a vibration of the vibrator resonates with a vibration resulting from another stimulus. The nerves may sense the generated stimulus so that the user senses a presence of the other stimulus.

16 Claims, 12 Drawing Sheets

400

VIBRATOR CONTROLLING METHOD AND APPARATUS

CROSS-REFERENCE TO RELATED APPLICATION

This application claims under 35 U.S.C. § 119 to Korean Patent Application No. 10-2017-0137294, filed on Oct. 23, 2017, in the Korean Intellectual Property Office, the entire contents of which are incorporated herein by reference in their entirety.

BACKGROUND

1. Field

At least one example embodiment relates to a method and/or apparatus for controlling a vibrator. For example, at least some example embodiments relate to a method and/or apparatus for controlling a vibrator to operate with a preset vibration amplitude.

2. Description of the Related Art

In nerves of a human, a threshold at which stimulation is to be sensed may increase as a result of aging. A sensitivity of the nerves may decrease in a process of aging. When the sensitivity of the nerves decreases, a stimulus below the threshold may not be sensed, so that risks may not be detected. For example, when a sole pressure is not sensed properly, there may be a risk of falling.

SUMMARY

Some example embodiments relate to a vibrator controlling method.

In some example embodiments, the vibrator controlling method includes determining a vibration amplitude of a vibrator; determining a vibration direction for a single sample period based on a number; generating an initial vibration signal based on the vibration amplitude and the vibration direction; generating a final vibration signal by filtering out a component of the initial vibration signal exceeding a set frequency; and controlling the vibrator based on the final vibration signal.

In some example embodiments, the determining of the vibration amplitude includes receiving information on the vibration amplitude from a user through a user interface.

In some example embodiments, the determining of the vibration direction includes randomly generating the number; and determining the vibration direction as one of a positive direction and a negative direction based on the random number.

In some example embodiments, the generating of the final vibration signal includes applying the initial vibration signal through a low pass filter to generate the final vibration signal, the low pass filter passing components of the initial vibration signal that are below the set frequency.

In some example embodiments, the set frequency is set based on an operating frequency of the vibrator.

In some example embodiments, the vibrator includes a plurality of vibrators, and the generating of the final vibration signal includes generating a plurality of final vibration signals each associated with a respective one of the plurality of vibrators.

Some example embodiments relate to a non-transitory computer-readable medium includes a computer program configured to control a processor to perform a vibrator controlling method including Some example embodiments relate to a vibrator controlling apparatus.

In some example embodiments, the vibrator controlling apparatus may include a vibrator configured to output a vibration using a motor; a memory configured to store a program for controlling the vibrator; and a processor configured to execute the program to, determine a vibration amplitude of the vibrator, determine a vibration direction for a single sample period based on a number, generate an initial vibration signal based on the vibration amplitude and the vibration direction, generate a final vibration signal by filtering out a component of the initial vibration signal exceeding a set frequency, and control the vibrator based on the final vibration signal.

In some example embodiments, the processor is configured to determine the vibration amplitude by receiving information on the vibration amplitude from a user through a user interface.

In some example embodiments, the user interface includes a short-range wireless communication device, and wherein the processor is configured to receive the information on the vibration amplitude from a user terminal connected through the short-range wireless communication device.

In some example embodiments, the user interface includes at least one of a physical button and a touch panel, the at least one of the physical button and the touch panel configured to receive a user touch input, and wherein the processor is configured to receive the information on the vibration amplitude by receiving the user touch input through the at least one of the physical button and the touch panel.

In some example embodiments, the processor is configured to determine the vibration amplitude such that the vibration is not sensed by a user wearing the vibrator controlling apparatus when determining the vibration amplitude.

In some example embodiments, the processor is configured to determine the vibration direction by, randomly generating the number, and determining the vibration direction as one of a positive direction and a negative direction based on the random number.

In some example embodiments, the processor is configured to generate the final vibration signal by, applying the initial vibration signal through a low pass filter to generate the final vibration signal, the low pass filter passing components of the initial vibration signal that are below the set frequency.

In some example embodiments, the processor is configured to set the set frequency based on an operating frequency of the vibrator.

In some example embodiments, the vibrator includes a plurality of vibrators, and the processor is configured to generate a plurality of final vibration signals each associated with a respective one of the plurality of vibrators.

In some example embodiments, the vibrator controlling apparatus further includes a rechargeable battery configured to, supply power to the vibrator controlling apparatus, and recharge the rechargeable battery wirelessly.

In some example embodiments, the vibrator controlling apparatus further includes a pad between the vibrator and a skin of a user.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
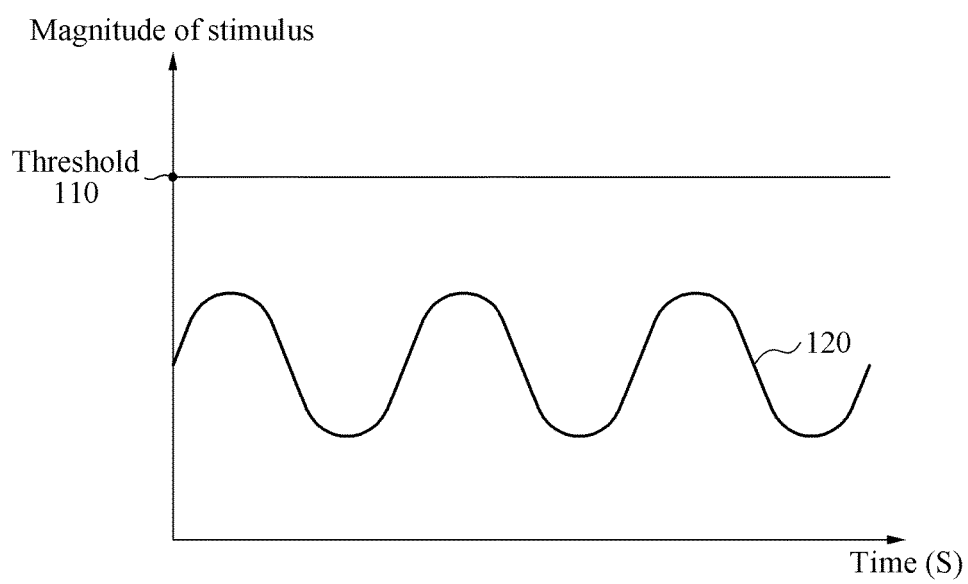
FIGS. 1 and 2 are diagrams illustrating a stochastic resonance phenomenon according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Figure 2:
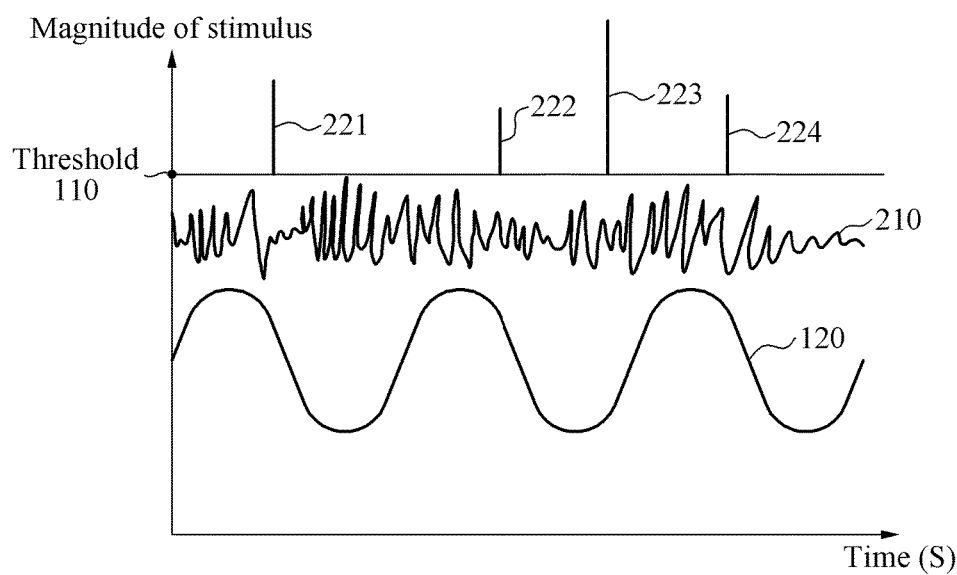

FIGS. 1 and 2 are diagrams illustrating a stochastic resonance phenomenon according to at least one example embodiment.

Referring to FIGS. 1 and 2, a nerve in a skin may sense an external stimulus and transfer the external stimulus to a spinal cord and a brain. The nerve may include, for example, a pain spot, a pressure spot, a cold spot, a warm spot, and a touch spot.

The nerve may sense an external stimulus 120 greater than or equal to a threshold 110. When the external stimulus 120 is less than the threshold 110, the nerve may not sense the external stimulus 120.

The threshold 110 of the nerve may increase due to an aging. A stimulus, which is sufficient to be sensed previously, may not be sensed when the threshold 110 increases. For example, when a nerve in a sole does not sense a stimulus in walking, a risk of an accident such as a falling accident may increase. In contrast, in one or more example embodiments, to assist the nerve in sensing, a stochastic resonance phenomenon may be applied. The stochastic resonance phenomenon may be a phenomenon that a stimulation of the threshold 110 or more occurs due to a resonance between at least two stimuli.

For example, in one or more example embodiments, when the external stimulus 120 is less than the threshold 110 and an additional stimulus 210 is applied in addition to the external stimulus 120, stimuli 221, 222, 223, and 224 greater than or equal to the threshold 110 may be generated through a resonance between the external stimulus 120 and the additional stimulus 210. The stimuli 221, 222, 223, and 224 generated through the resonance between at least two stimuli may also be referred to as stochastic resonance stimuli. When the external stimulus 120 has a constant frequency and the additional stimulus 210 has an arbitrarily changing frequency, the stochastic resonance stimuli 221, 222, 223, and 224 may be generated.

When the stochastic resonance stimuli 221, 222, 223, and 224 are applied, the nerve may sense the stochastic resonance stimuli 221, 222, 223, and 224. Although the external stimulus 120 is not always sensed by the nerve, the nerve may sense the stochastic resonance stimuli 221, 222, 223, and 224 to sense the external stimulus 120. In this example, a sensitivity of the nerve may increase due to the additional stimulus 210.

A vibrator controlling method for generating a stochastic resonance stimulation will be further described below with reference to FIGS. 3 through 12.

Figure 3:
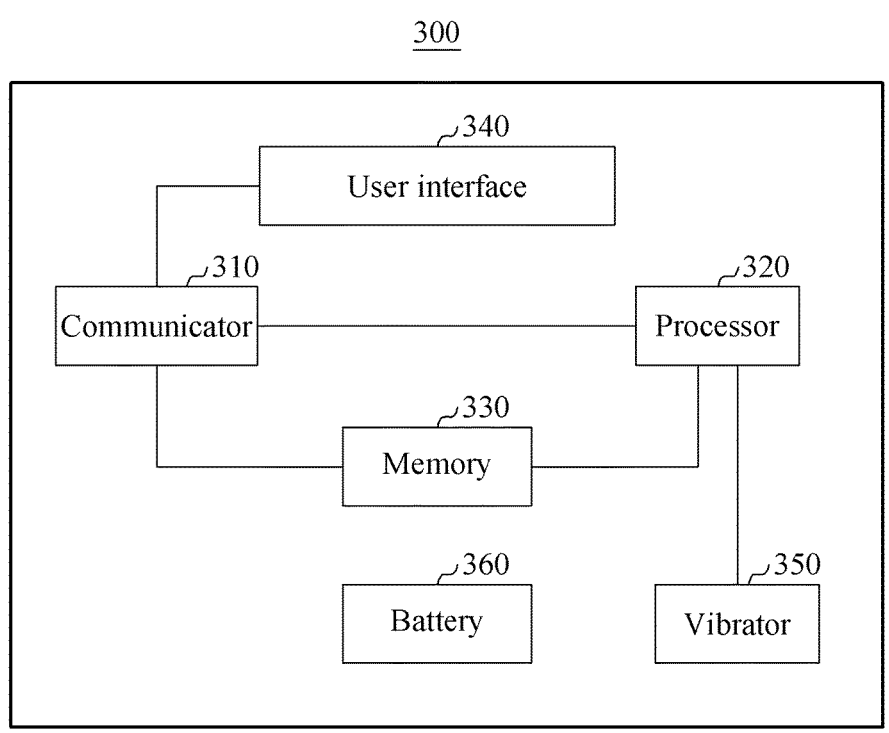
FIG. 3 is a block diagram illustrating a vibrator controlling apparatus according to at least one example embodiment.

FIG. 3 is a block diagram illustrating a vibrator controlling apparatus according to at least one example embodiment.

Referring to FIG. 3, a vibrator controlling apparatus 300 may include a communicator 310, a processor 320, a memory 330, a user interface 340, a vibrator 350, and a battery 360.

The communicator 310 may be connected to the processor 320, the memory 330, and the user interface 340 to perform data transmission and reception. Also, the communicator 310 may be connected to an external device to perform data transmission and reception. In the following description, an expression "transmitting and receiving "A"" refers to transmitting and receiving data or information representing "A".

The communicator 310 may be implemented as, for example, a circuitry in the vibrator controlling apparatus 300. In an example, the communicator 310 may include an internal bus and an external bus. In another example, the communicator 310 may be an element configured to connect the vibrator controlling apparatus 300 to an external device. The communicator 310 may be, for example, an interface. The communicator 310 may receive data from the external device and transmit data to the processor 320 and the memory 330.

The processor 320 may process data received by the communicator 310 and data stored in the memory 330. The term "processor," as used herein, may be a hardware-implemented data processing device having a circuit that is physically structured to execute desired operations. For example, the desired operations may include code or instructions included in a program. The hardware-implemented data processing device may include, but is not limited to, for example, a microprocessor, a central processing unit (CPU), a processor core, a multi-core processor, a multiprocessor, an application-specific integrated circuit (ASIC), and a field-programmable gate array (FPGA).

The processor 320 may execute a computer-readable code (for example, software) stored in a memory (for example, the memory 330), and execute instructions generated by the processor 320. For example, as discussed in more detail below, the processor 320 may execute computer-readable code that configures the processor 320 as a special purpose computer to generate a final vibration signal having an frequency that changes (e.g., randomly) such that at least a portion of the final vibration signal may resonate along with the external stimulus 120, and, thus may increase the external stimulus 120 to, for example, one of the stimuli 221, 222, 223, and 224 greater than or equal to the threshold 110. Therefore, the processor 320 may improve the functioning of the vibration controlling apparatus 300 and/or a walking assistance device including the same by allowing a user to more easily recognize the external stimulus 120 and respond to the same.

The memory 330 may store data received by the communicator 310 and data processed by the processor 320. For example, the memory 330 stores a program. The stored program may be a set of syntaxes executable by the processor 320 and coded to control a vibrator.

The memory 330 may include, for example, at least one volatile memory, a nonvolatile memory, a random access memory (RAM), a flash memory, a hard disk drive and an optical disc drive.

The memory 330 may store an instruction set (for example, software) to operate the vibrator controlling apparatus 300. The instruction set to operate the vibrator controlling apparatus 300 may be executed by the processor 320.

The user interface 340 may receive a user input. In an example, the user interface 340 may include a physical button such that a user transmits an input using the physical button. In another example, the user interface 340 may include a touch panel such that a user transmits a touch input using the touch input. In still another example, the user interface 340 may exchange data with a user terminal. The user interface 340 may include a short-range communication device to exchange the data with the user terminal. The user may transmit the input to the vibrator controlling apparatus 300 through an application installed in the user terminal.

The vibrator 350 may generate a vibration. For example, the vibrator 350 may generate a directional vibration using a piezo motor. A direction of vibration may indicate a positive direction and a negative direction opposite to the positive direction.

The battery 360 may supply power to the vibrator controlling apparatus 300. For example, the battery 360 may be a rechargeable battery. Also, the battery 360 may be changed wirelessly.

The communicator 310, the processor 320, the memory 330, the user interface 340, the vibrator 350, and the battery 360 will be further described below with reference to FIGS. 4 through 12.

Figure 4:
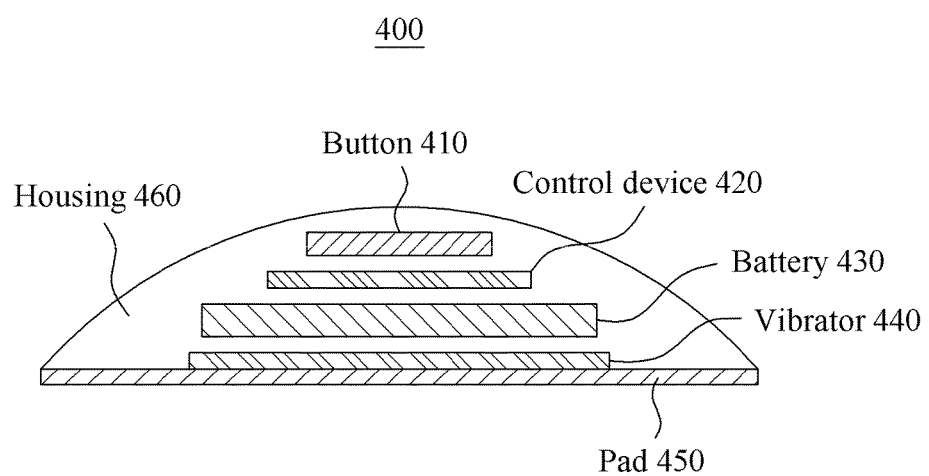
FIG. 4 is a cross-sectional view illustrating a vibrator controlling apparatus according to at least one example embodiment.

FIG. 4 is a cross-sectional view illustrating a vibrator controlling apparatus according to at least one example embodiment.

Referring to FIG. 4, a vibrator controlling apparatus 400 may be the vibrator controlling apparatus 300 of FIG. 3. The vibrator controlling apparatus 400 may further include a pad 450 and a housing 460.

The pad 450 may be disposed between a vibrator and a skin of a user. The pad 450 may include a material to be in close contact with the skin of the user. For example, the pad 450 may include an adhesive material to be attached to the skin of the user.

The housing 460 may be formed to have a thickness so that the user wearing the vibrator controlling apparatus 400 does not experience an inconvenience. The housing 460 may include, for example, a gel-type material.

The vibrator controlling apparatus 400 may include a button 410. The button 410 may be located inside the housing 460. When the housing 460 is formed of the gel-type material, the user may apply a pressure to a position of the button 410 in the housing 460 to operate the button 410.

A control device 420 may be a data processing module of the vibrator controlling apparatus 400. The control device 420 may be provided in a form of a system on chip (SoC) including the communicator 310, the processor 320, and the memory 330 of FIG. 3.

A battery 430 and a vibrator 440 may correspond to the battery 360 and the vibrator 350 of FIG. 3.

Figure 5:
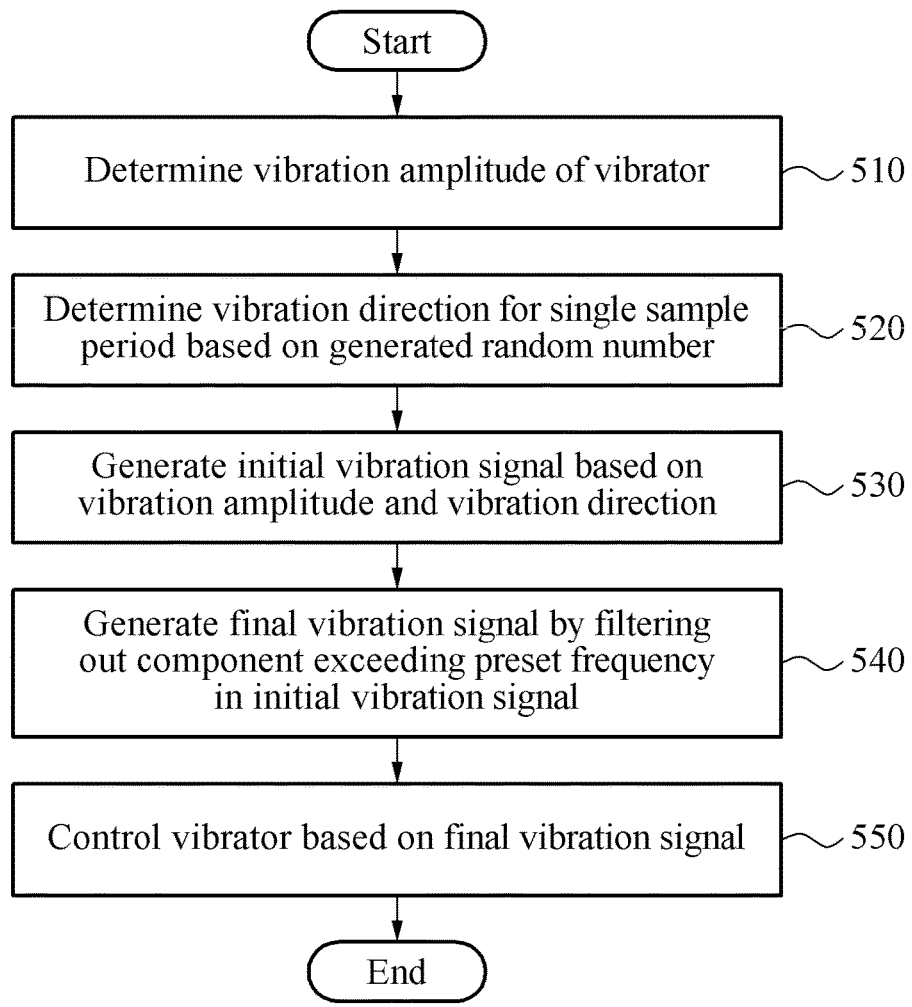
FIG. 5 is a flowchart illustrating a vibrator controlling method according to at least one example embodiment.

FIG. 5 is a flowchart illustrating a vibrator controlling method according to at least one example embodiment.

Referring to FIG. 5, operations 510 through 550 may be performed by the vibrator controlling apparatus 300 of FIG. 3 and/or the vibrator controlling apparatus 400 of FIG. 4.

In operation 510, the processor 320 may determine a vibration amplitude of the vibrator 350. The vibration amplitude may be determined based on a user input received through the user interface 340. The user input may be received through a touch panel or a button. In an example, the user interface 340 may be used to receive information on the vibration amplitude from a user. In another example, the information on the vibration amplitude may be received from a user terminal. A method of receiving the information on the vibration amplitude from the user terminal will be further described with reference to FIG. 6.

In operation 520, the processor 320 may determine a vibration direction for a single sample period based on a generated random number. When the vibrator 350 vibrates in a single direction, whether the vibrator 350 vibrates may be determined. When the vibrator 350 vibrates in two directions, whether the vibrator 350 vibrates in a positive direction or a negative direction may be determined. The negative direction is a direction opposite to the positive direction. A vibration direction may be determined for each of a plurality of sample periods. A method of determining the vibration direction will be further described with reference to FIG. 8.

In operation 530, the processor 320 may generate an initial vibration signal based on the vibration amplitude and the vibration direction. The initial vibration signal may be a vibration pattern for a plurality of samples periods that are temporarily consecutive. The initial vibration signal will be further described with reference to FIG. 9.

In operation 540, the processor 320 may generate a final vibration signal by filtering out a component exceeding a preset frequency in the initial vibration signal. A method of generating the final vibration signal will be further described with reference to FIGS. 10 and 11.

In operation 550, the processor 320 may control the vibrator 350 based on the final vibration signal.

Figure 6:
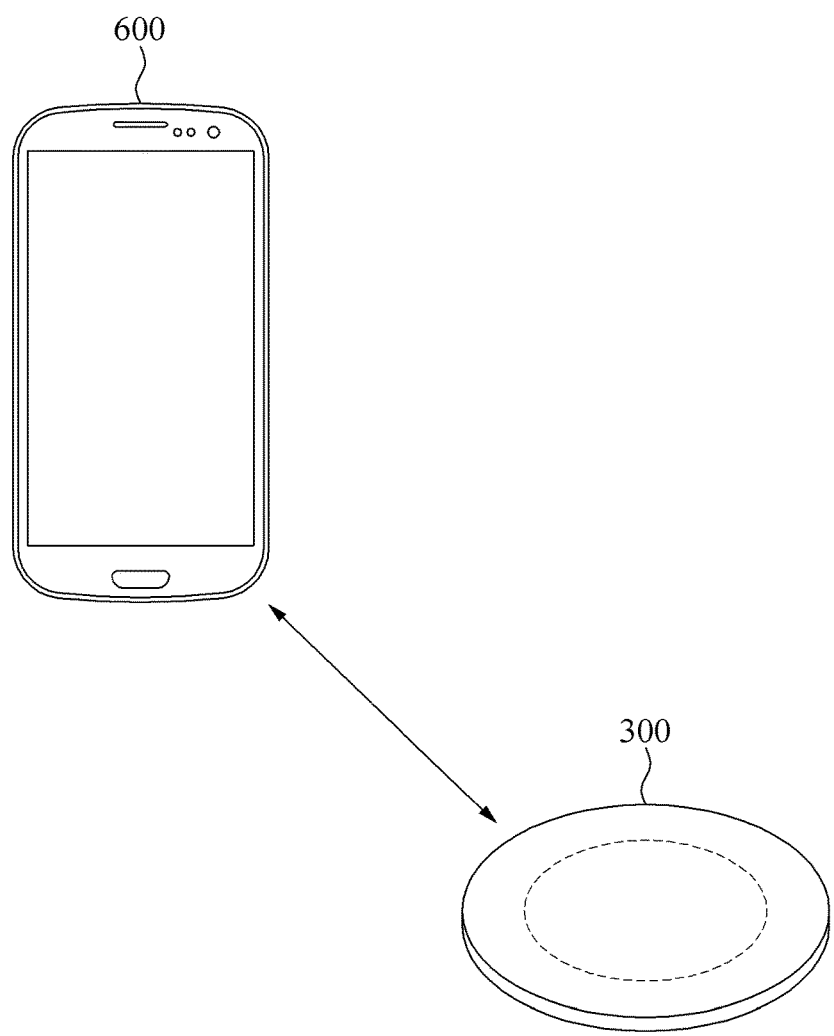
FIG. 6 is a diagram illustrating a vibrator controlling system according to at least one example embodiment.

FIG. 6 is a diagram illustrating a vibrator controlling system according to at least one example embodiment.

A vibrator controlling system may include a user terminal 600 and the vibrator controlling apparatus 300. The user terminal 600 may exchange data with the vibrator controlling apparatus 300 through wireless communication. The wireless communication may be, for example, a short-range wireless communication and there is no limitation on a method of performing the short-range wireless communication.

The user terminal 600 may control the vibrator controlling apparatus 300 through an application installed in the user terminal 600. The user terminal 600 may control a power supply of the vibrator controlling apparatus 300 and transmit information on a vibration amplitude to the vibrator controlling apparatus 300.

Figure 7:
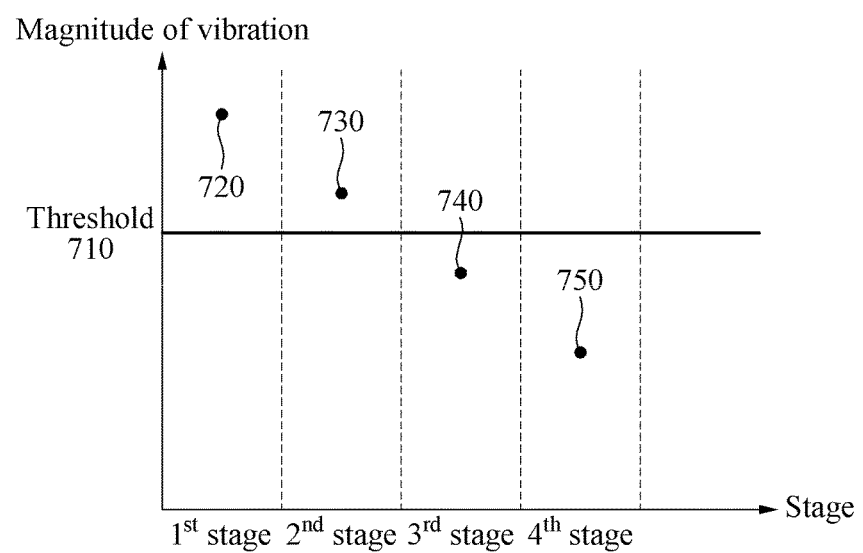
FIG. 7 is a diagram illustrating a magnitude of vibration for each stage according to at least one example embodiment.

FIG. 7 is a diagram illustrating a magnitude of vibration for each stage according to at least one example embodiment.

In the vibrator controlling apparatus 300, stages of a plurality of vibration amplitudes may be set in advance. A vibration amplitude may be mapped to each of the stages. A magnitude of vibration may increase as the vibration amplitude increases. For example, a magnitude of a first vibration 720 corresponding to a first stage may be the largest and a magnitude of a fourth vibration 740 corresponding to a fourth stage may be the smallest.

A user of the vibrator controlling apparatus 300 may attach the vibrator controlling apparatus 300 to a portion of a body and determine a vibration amplitude. A nerve of a skin on which the vibrator controlling apparatus 300 is attached may have a threshold 710 for stimulation.

The nerve may sense the magnitude of the first vibration 720 and a magnitude of a second vibration 730 and may not sense a magnitude of a third vibration 740 and the magnitude of the fourth vibration 750. The user may determine the vibration amplitude by increasing or lowering a stage. The user may determine a magnitude of a vibration not to be sensed by the user while the vibration is being applied. The vibration amplitude may be determined such that the user wearing the vibrator controlling apparatus 300 on a portion of the body does not sense the vibration. When a magnitude of a vibration changes from the magnitude of the second vibration 730 to the magnitude of the third vibration 740, the user may not sense the vibration. The user may determine a vibration amplitude at which the third vibration 740 occurs, to be an operating vibration amplitude.

The vibration amplitude may be differently determined depending on a portion to which the vibrator controlling apparatus 300 is attached or the user. For example, when the threshold 710 increases due to the aging, a vibration amplitude at which the second vibration 730 occurs may be determined to be an operating vibration amplitude.

Figure 8:
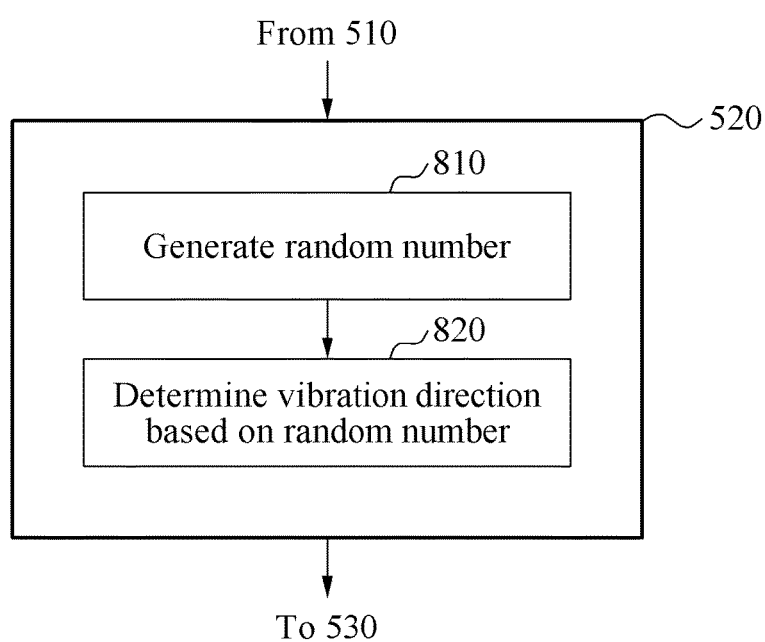
FIG. 8 is a flowchart illustrating a method of determining a vibration direction according to at least one example embodiment.

FIG. 8 is a flowchart illustrating a method of determining a vibration direction according to at least one example embodiment.

Referring to FIGS. 5 and 8, operation 520 of FIG. 5 may include operations 810 and 820.

In operation 810, the processor 320 may generate a random number.

In operation 820, the processor 320 may determine a vibration direction based on the random number. The determined vibration direction may be for a single sample period. When the random number is an odd number, the vibration direction may be determined to be a positive direction. When the random number is an even number, the vibration direction may be determined to be a negative direction. When a last bit of the random number is 1, the vibration direction may be determined to be the positive direction. When a last bit of the random number is 0, the vibration direction may be determined to be the negative direction. However, example embodiments are not limited thereto.

Figure 9:
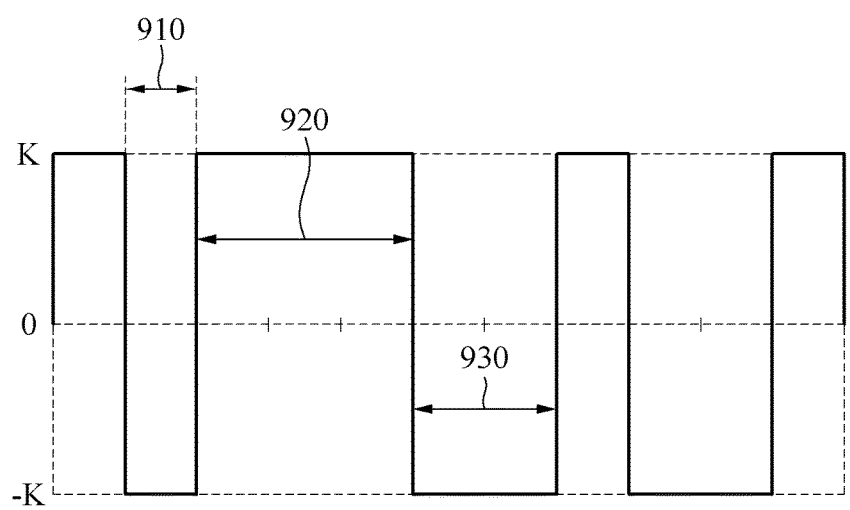
FIG. 9 is a diagram illustrating an initial vibration signal according to at least one example embodiment.

FIG. 9 is a diagram illustrating an initial vibration signal according to at least one example embodiment.

Referring to FIG. 9, an initial vibration signal for a plurality of sample periods may be generated. A vibration amplitude may be K, where K is a set (or, alternatively, a preset) positive number. For example, a negative-directional vibration may be determined in a sample period 910, a positive-directional vibration may be determined in sample periods 920, and a negative-directional vibration may be determined in sample periods 930.

The smaller the change in the vibration direction, the lower the vibration frequency. Similarly, the more the vibration direction changes, the higher the vibration frequency. For example, a vibration frequency of the sample period 910 may be higher than a vibration frequency of the sample periods 920 and a vibration frequency of the sample periods 930.

A high-frequency vibration may be a burden to an operation of the vibrator 350. A high-frequency component may be removed from an initial vibration signal to reduce a burden of the vibrator 350. A method of removing the high-frequency component and a final vibration signal obtained by removing the high-frequency component will be further described with reference to FIGS. 10 and 11.

Figure 10:
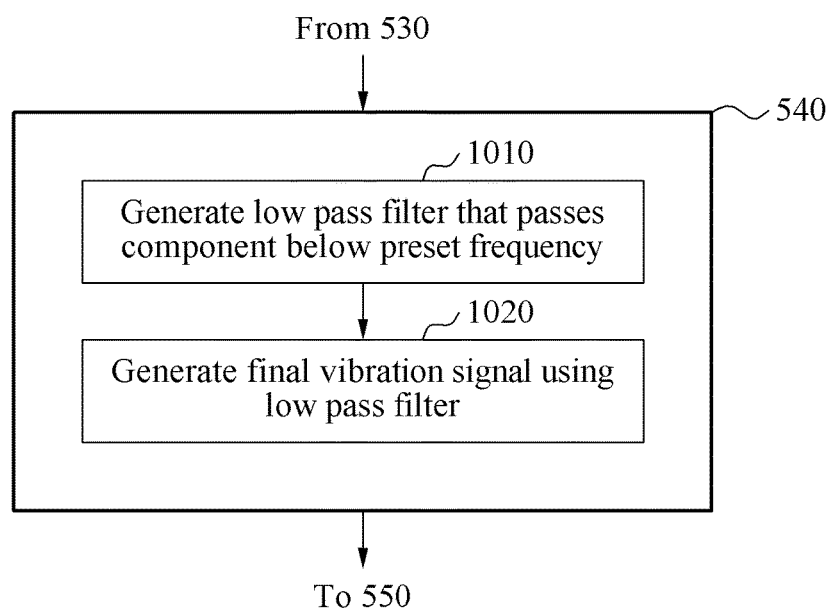
FIG. 10 is a flowchart illustrating a method of generating a final vibration signal according to at least one example embodiment.

FIG. 10 is a flowchart illustrating a method of generating a final vibration signal according to at least one example embodiment.

Referring to FIGS. 5 and 10, operation 540 of FIG. 5 may include operations 1010 and 1020.

In operation 1010, the processor 320 may generate a low pass filter that passes a component below a preset frequency. A frequency to be set may be determined based on an operating frequency of the vibrator 350. The frequency may be set to be less than or equal to a maximum operating frequency of the vibrator 350.

In operation 1020, the processor 320 may generate a final vibration signal using the low pass filter. A high-frequency component of an initial vibration signal may be filtered out by the low pass filter. The final vibration signal may be generated by removing the high-frequency component from the initial vibration signal.

Figure 11:
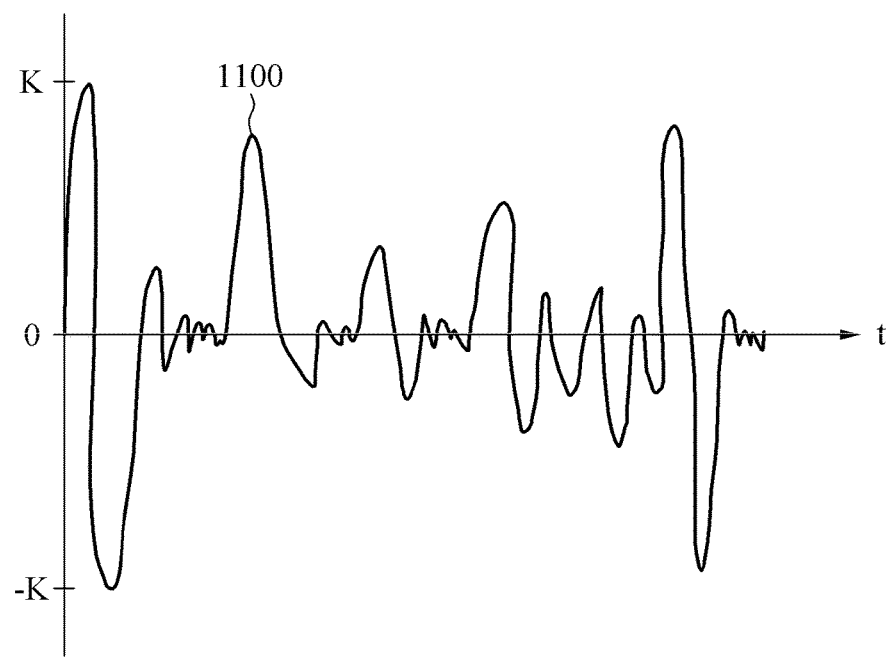
FIG. 11 is a diagram illustrating a final vibration signal according to at least one example embodiment.

FIG. 11 is a diagram illustrating a final vibration signal according to at least one example embodiment.

Referring to FIG. 11, a final vibration signal 1100 may have a value between a maximum value K and a minimum value −K. The final vibration signal 1100 may have a frequency arbitrarily changing on a time-by-time basis. The final vibration signal 1100 may be, for example, white noise having the value between the maximum value K and the minimum value −K. Since the final vibration signal 1100 has a variable frequency, a probability of the final vibration signal 1100 resonating with the external stimulus 120 may increase. When the final vibration signal 1100 resonates with the external stimulus 120, a stimulus of at least a threshold of a nerve may be generated, so that the nerve detects the generated stimulus.

Although the external stimulus 120 is not always detected by a user, the user may detect a resonance signal generated by the final vibration signal 1100 to acknowledge a presence of the external stimulus 120. In this example, a sensitivity of a nerve may increase due to the final vibration signal 1100.

Figure 12:
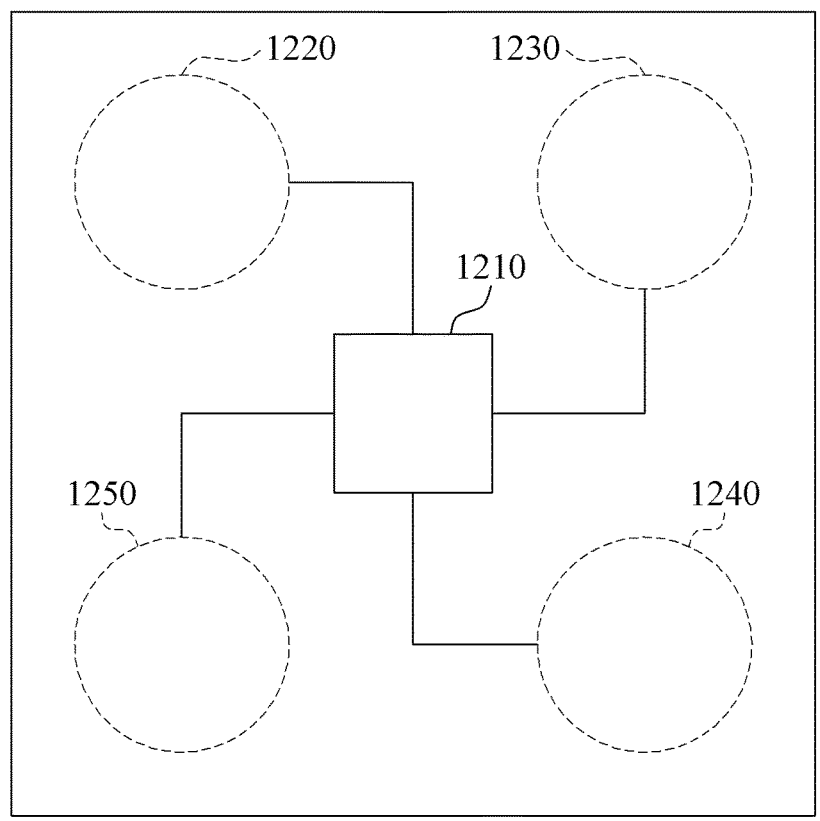
FIG. 12 is a diagram illustrating a vibrator controlling apparatus including a plurality of vibrators according to at least one example embodiment.

FIG. 12 is a diagram illustrating a vibrator controlling apparatus including a plurality of vibrators according to at least one example embodiment.

Referring to FIG. 12, a vibrator controlling apparatus 1200 may include a plurality of vibrators 1220 through 1250 and at least one processor 1210 configured to control the plurality of vibrators 1220 through 1250. Nerves located at positions to which the plurality of vibrators 1220 through 1250 may have different thresholds.

The processor 1210 may determine a vibration amplitude for each of the plurality of vibrators 1220 through 1250. The processor 1210 may generate different vibration signals with respect to the plurality of vibrators 1220 through 1250. The at least processor 1210 may include a single processor configured to control the plurality of vibrators 1220 through 1250 or may include multiple processors 1220 each associated with a respective one of the vibrators 1220 through 1250.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A vibrator controlling method comprising:
  determining a vibration amplitude of a vibrator;
  determining a vibration direction for a single sample period by, generating a random number, and
determining the vibration direction within the single sample period as one of a positive direction and a negative direction based on the random number;
generating an initial vibration signal based on the vibration amplitude and the vibration direction such that the initial vibration signal cyclically increases or decreases in frequency based on the vibration direction;
generating a final vibration signal by filtering out a component of the initial vibration signal exceeding a set frequency; and
controlling the vibrator based on the final vibration signal such that, as the frequency of vibration generated by the vibrator cyclically increases or decreases, at least a portion of the vibration has a same resonate frequency as an external stimulus.

2. The vibrator controlling method of claim 1, wherein the determining of the vibration amplitude comprises:
receiving information on the vibration amplitude from a user through a user interface.

3. The vibrator controlling method of claim 1, wherein the generating of the final vibration signal comprises:
applying the initial vibration signal through a low pass filter to generate the final vibration signal, the low pass filter passing components of the initial vibration signal that are below the set frequency.

4. The vibrator controlling method of claim 1, wherein the set frequency is set based on an operating frequency of the vibrator.

5. The vibrator controlling method of claim 1, wherein the vibrator includes a plurality of vibrators, and the generating of the final vibration signal comprises:
generating a plurality of final vibration signals each associated with a respective one of the plurality of vibrators.

6. A non-transitory computer-readable medium comprising a computer program configured to control a processor to perform the vibrator controlling method of claim 1.

7. A vibrator controlling apparatus comprising:
a vibrator configured to output a vibration using a motor;
a memory configured to store a program for controlling the vibrator; and
a processor configured to execute the program to,
determine a vibration amplitude of the vibrator,
determine a vibration direction for a single sample period by,
generating a random number, and
determining the vibration direction within the single sample period as one of a positive direction and a negative direction based on the random number,
generate an initial vibration signal based on the vibration amplitude and the vibration direction such that the initial vibration signal cyclically increases or decreases in frequency based on the vibration direction,
generate a final vibration signal by filtering out a component of the initial vibration signal exceeding a set frequency, and
control the vibrator based on the final vibration signal such that, as the frequency of vibration generated by the vibrator cyclically increases or decreases, at least a portion of the vibration has a same resonate frequency as an external stimulus.

8. The vibrator controlling apparatus of claim 7, wherein the processor is configured to determine the vibration amplitude by receiving information on the vibration amplitude from a user through a user interface.

9. The vibrator controlling apparatus of claim 8, wherein the user interface comprises:
a short-range wireless communication device, and wherein
the processor is configured to receive the information on the vibration amplitude from a user terminal connected through the short-range wireless communication device.

10. The vibrator controlling apparatus of claim 8, wherein the user interface comprises:
at least one of a physical button and a touch panel, the at least one of the physical button and the touch panel configured to receive a user touch input, and wherein
the processor is configured to receive the information on the vibration amplitude by receiving the user touch input through the at least one of the physical button and the touch panel.

11. The vibrator controlling apparatus of claim 7, wherein the processor is configured to determine the vibration amplitude such that the vibration is not sensed by a user wearing the vibrator controlling apparatus when determining the vibration amplitude.

12. The vibrator controlling apparatus of claim 7, wherein the processor is configured to generate the final vibration signal by,
applying the initial vibration signal through a low pass filter to generate the final vibration signal, the low pass filter passing components of the initial vibration signal that are below the set frequency.

13. The vibrator controlling apparatus of claim 7, wherein the processor is configured to set the set frequency based on an operating frequency of the vibrator.

14. The vibrator controlling apparatus of claim 7, wherein the vibrator includes a plurality of vibrators, and
the processor is configured to generate a plurality of final vibration signals each associated with a respective one of the plurality of vibrators.

15. The vibrator controlling apparatus of claim 7, further comprising:
a rechargeable battery configured to,
supply power to the vibrator controlling apparatus, and
recharge the rechargeable battery wirelessly.

16. The vibrator controlling apparatus of claim 7, further comprising:
a pad between the vibrator and a skin of a user.

* * * * *